「United States Patent」

Humphries

(10) Patent No.: US 10,193,419 B2
(45) Date of Patent: Jan. 29, 2019

(54) AIR GAP BAFFLE TRAIN FOR TURBINE GENERATOR

(71) Applicant: Siemens Energy, Inc., Orlando, FL (US)

(72) Inventor: Benjamin Todd Humphries, Orlando, FL (US)

(73) Assignee: SIEMENS ENERGY, INC., Orlando, FL (US)

( * ) Notice: Subject to any disclaimer, the term of this patent is extended or adjusted under 35 U.S.C. 154(b) by 331 days.

(21) Appl. No.: 15/303,022

(22) PCT Filed: Apr. 2, 2015

(86) PCT No.: PCT/US2015/024007
§ 371 (c)(1),
(2) Date: Oct. 10, 2016

(87) PCT Pub. No.: WO2015/157078
PCT Pub. Date: Oct. 15, 2015

(65) Prior Publication Data
US 2017/0033644 A1    Feb. 2, 2017

Related U.S. Application Data

(60) Provisional application No. 61/977,810, filed on Apr. 10, 2014.

(51) Int. Cl.
*H02K 3/24*    (2006.01)
*H02K 7/18*    (2006.01)
(Continued)

(52) U.S. Cl.
CPC ............. *H02K 7/1823* (2013.01); *H02K 9/02* (2013.01); *H02K 9/10* (2013.01); *H02K 3/24* (2013.01); *H02K 2201/03* (2013.01)

(58) Field of Classification Search
CPC .......... H02K 7/1823; H02K 9/02; H02K 9/10; H02K 3/24; H02K 2201/03; H02K 3/487
(Continued)

(56) References Cited

U.S. PATENT DOCUMENTS 3,906,265 A    9/1975 Giles
4,264,834 A *  4/1981 Armor ..................... H02K 9/10
                                                                310/55

(Continued)

FOREIGN PATENT DOCUMENTS

WO    02086279 A1    10/2002

OTHER PUBLICATIONS

PCT International Search Report and Written Opinion dated Jun. 15, 2015 corresponding to PCT Application No. PCT/US2015/024007 filed Apr. 2, 2015 (11 pages).

*Primary Examiner* — Jeremy A Luks

(57) ABSTRACT

A baffle train for turbine generator air baffles independently aligns axial position of the composite air baffle along a stator core bore axial slot. Air baffle sectors that form the composite air baffle are coupled to baffle blocks of the baffle train. The baffle blocks are positioned axially along at least one axial spacer rod corresponding to the desired position of the composite air baffle within the stator bore. The baffle blocks are locked into position by a locking engagement member. Wedge blocks are axially spaced on a reciprocating wedge block rod within the stator slot below the baffle blocks. A biasing element, such as arched leaf spring, tensions the baffle block radially inwardly toward the stator bore when the wedge blocks are reciprocated below the baffle blocks.

20 Claims, 5 Drawing Sheets

(51) Int. Cl.
*H02K 9/02* (2006.01)
*H02K 9/10* (2006.01)

(58) Field of Classification Search
USPC .................................................. 310/214, 215
See application file for complete search history.

(56) References Cited

U.S. PATENT DOCUMENTS

| | | | | |
|---|---|---|---|---|
| 4,609,840 A * | 9/1986 | Eats | ......................... | H02K 9/00 310/216.016 |
| 4,751,412 A | 6/1988 | Lowther et al. | | |
| 5,177,385 A * | 1/1993 | Cooper | .................. | H02K 1/185 310/260 |
| 6,943,470 B2 * | 9/2005 | Rowe | ...................... | H02K 9/005 310/58 |
| 6,987,337 B2 * | 1/2006 | Lowther | .................. | H02K 9/10 310/54 |
| 7,266,884 B2 * | 9/2007 | Stewart | .............. | H02K 15/0018 29/252 |
| 2010/0074572 A1 | 3/2010 | Zheng et al. | | |
| 2010/0074727 A1 | 3/2010 | Twerdochlib | | |
| 2011/0069165 A1 | 3/2011 | Zombo et al. | | |

* cited by examiner

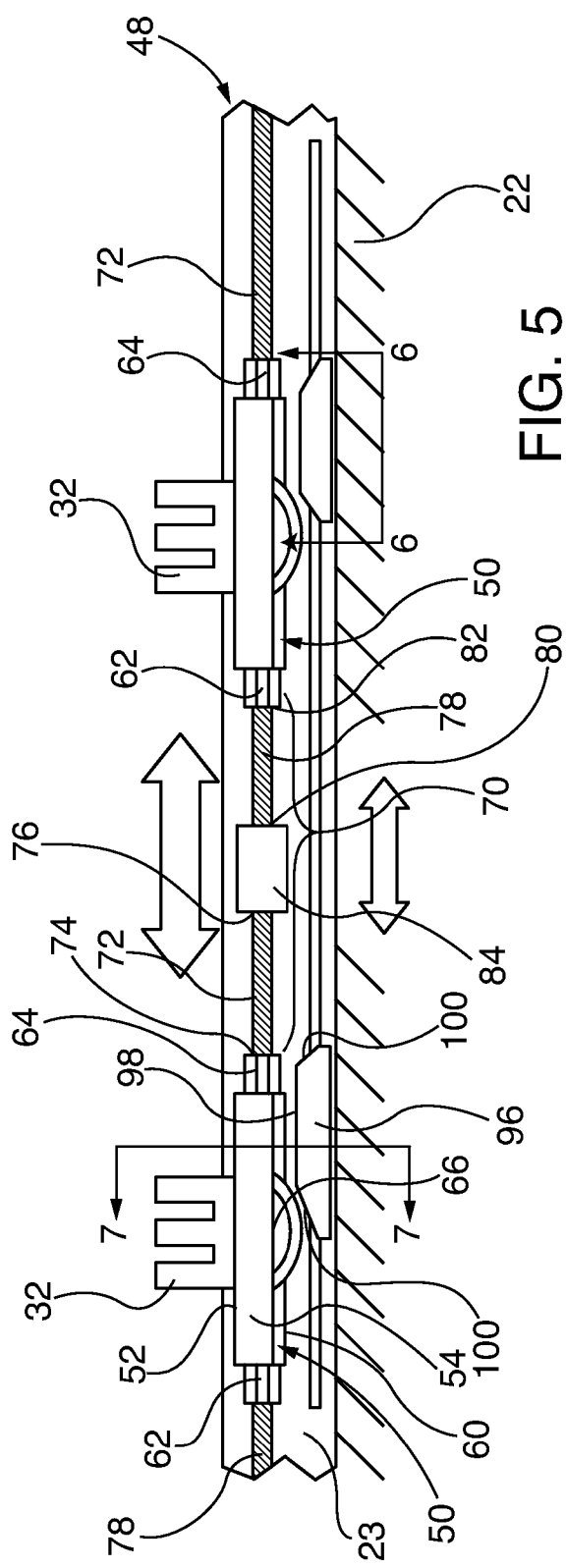
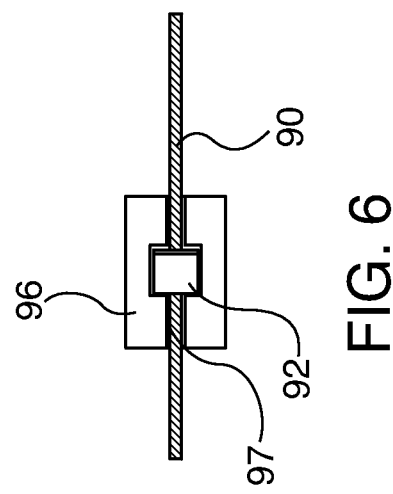
FIG. 5
FIG. 6

AIR GAP BAFFLE TRAIN FOR TURBINE GENERATOR

PRIORITY CLAIM

This application is the U.S. National Stage of International Application No. PCT/US2015/024007 filed Apr. 2, 2015, which claims the benefit of priority of provisional patent application entitled "IMPROVED AIR GAP BAFFLE TRAIN FOR TURBINE GENERATOR" filed Apr. 10, 2014 and assigned Ser. No. 61/977,810, the entire contents of each application is incorporated by reference.

TECHNICAL FIELD

The invention relates to air gap baffle trains for turbine generators that establish in combination one or more axially aligned composite airflow baffles circumscribing the stator bore within the air gap between the stator and rotor. More particularly, embodiments of the invention air baffle train independently align axial position of the air baffle sectors that form the composite airflow baffle along their respective stator core bore axial slots and maintain baffle sector axial and radial position during generator operation.

BACKGROUND ART

Known turbine generators employ internal air cooling systems to circulate cooling air within the machine. Cooling air circulation is directed by combinations of one or more of cooling channels, vanes, the centrifugal forces generated by the rotating rotor, convective thermal gradients and forced air fans. An exemplary known turbine generator 20 is shown in FIGS. 1 and 2. The generator's generally annular stator 22 has plurality of stator axial slots 23 circumferentially aligned about the stator bore 24. Among other places within the generator cooling air flows within an annular air gap 26 between the stator bore 26 and the rotating rotor 28. A plurality of axially aligned composite airflow baffles 30 circumscribe the stator bore and establish cooling airflow zones in the air gap 26 that are bounded by the composite baffles. Each composite baffle 30 is formed by adjoining axially aligned circumferential baffle sector portions 32 are supported by a plurality of air baffle trains 34 that are oriented in corresponding stator slots about the stator bore 24 circumference. Each baffle train 34 comprises a plurality of baffle sector wedges 36 that support individual baffle sector portions 32, which are axially separated by baffle wedge spacers 38, so that the ultimate spacing between baffle sector portions corresponds to the composite airflow baffle 30 locations within the stator bore 24 and air gap 26. The baffle sector wedges 36 and baffle wedge spacers 38 define commonly aligned through bores 40 that receive baffle wedge cable 42.

The wedge strings 36, 30 in each baffle train 34 are restrained in abutting contact by tensioning the baffle wedge cable 42 (analogous to a rigid bead chain) with a baffle wedge cable tensioner 44 that is coupled to the generator structure. The individual wedges 36, 38 must be trimmed to align the baffle sectors 32 in the various baffle trains 34 within the rotor slots, for proper desired composite baffle 30 orientation. Wedge trimming usually requires a number of attempts as any one wedge within a baffle train 34 impacts location of other wedges in the train. Cable tensioning also impacts ultimate linear location of each baffle sector within the train.

The wedges 36, 38 are constructed of cotton reinforced phenolic resin. That material has dimensional consistency challenges impacted by water absorption, shrinkage and thermo-mechanical creep. Over time and during generator operational service the baffle trains 34 loosen, causing slack between the wedges 36, 38 and resultant axial and/or radial misalignments of the baffle sectors 32. For example, baffle wedge 36 shrinkage can result in radial slop within the stator slot 23, which can vary the desired gap between the baffle sector 32 and the rotor 28. Either type of wedge 36 or 38 axial shrinkage alters axial orientation of the baffle sectors 32. Dimensional changes in any one of the wedges 36 or 38 in the baffle train 34 changes orientation of all of the other wedges in the train.

SUMMARY OF INVENTION

Exemplary embodiments of the baffle train maintain axial and radial position of baffle sector within its corresponding stator slot, so that the composite air baffle formed by adjoining baffle sectors remains in its desired axial location within the stator bore. Relative axial location of each baffle block and associated baffle sector is maintained by locking the respective baffle blocks to an axial spacer rod that is oriented within this corresponding stator slot. Potential dimensional variations within any one or more baffle blocks arrayed along the axial spacer rod does not impact axial position of any of the other baffle blocks along the axial spacer rod. The biasing element radially biases the upper surface of its corresponding baffle block against toward the stator bore and can flex to accommodate baffle block thickness dimensional instability.

Exemplary embodiments of the invention feature a turbine generator baffle train apparatus having a plurality of linearly aligned baffle blocks, each respectively having an external circumferential profile adapted for sliding receipt within a stator axial slot of a turbine generator stator bore. Each baffle block has a circumferential baffle sector portion on an upper surface of the baffle block, for radially inwardly projection into the stator bore when within a stator axial slot, a lower surface, and a thru bore. The baffle block baffle sector portions of circumferentially adjoining baffle trains in combination form a composite air baffle. The baffle train also has at least one axial spacer rod, adapted for sliding receipt within a turbine generator stator axial slot, passing through the respective baffle block thru bores. At least one locking engagement member couples each respective baffle block to the at least one axial spacer rod at an axial location corresponding to a desired axial location of the circumferential baffle sector within the generator bore. The baffle train also has a selectively reciprocating wedge block rod that is adapted for orientation within a turbine generator stator axial slot under the baffle blocks lower surfaces. A plurality of linearly aligned wedge blocks that are axially spaced relative to each other are coupled to the wedge block rod in axial positions corresponding to each baffle block axial position. Each wedge block respectively has an external circumferential profile adapted for sliding receipt within the turbine generator stator axial slot under the baffle blocks lower surfaces. In the baffle train a plurality of biasing elements are adapted for sliding receipt within a turbine generator stator axial slot, respectively adapted for biasing the upper surface of a corresponding baffle block toward the stator bore when a corresponding wedge block is axially aligned with a baffle block lower surface.

Other exemplary embodiments of the invention feature a turbine generator, having a generally annular stator having stator bore and a plurality of stator axial slots circumferentially aligned about the stator bore and a rotating rotor oriented within the stator bore. An annular air gap is defined between the rotor and stator bore. A plurality of baffle trains, respectively oriented within a corresponding stator axial slot, establish in combination an axially aligned composite airflow baffle circumscribing the stator bore, which thereby establishes cooling airflow zones in the air gap bounded by the composite baffle. Each respective baffle train has a plurality of linearly aligned baffle blocks. Each of the baffle blocks respectively has an external circumferential profile adapted for sliding receipt within a stator axial slot; a circumferential baffle sector portion on an upper surface for radially inwardly projection toward the stator bore; a lower surface and a thru bore. A plurality of axial spacer rods selectively varies the baffle block axial position within the corresponding stator slot, and is adapted for sliding receipt the stator axial slot, passing through the respective baffle block thru bores. At least one locking engagement member couples each respective baffle block to the axial spacer rod at an axial location corresponding to a desired axial location of the circumferential baffle sector within the generator bore. A selectively reciprocating wedge block rod is adapted for orientation within the corresponding stator axial slot under the baffle blocks lower surface. The baffle train has a plurality of linearly aligned wedge blocks that are axially spaced relative to each other and coupled to the wedge block rod in axial positions corresponding to each baffle block axial position. Each wedge block respectively has an external circumferential profile adapted for sliding receipt within the corresponding stator axial slot under the baffle blocks lower surfaces. A plurality of biasing elements, adapted for sliding receipt within the corresponding stator axial slot, are respectively adapted for biasing the upper surface of a corresponding baffle block toward the stator bore when a corresponding wedge block is axially aligned with the baffle block lower surface.

Additional exemplary embodiments of the invention feature a method for axially aligning circumferential cooling air composite air baffles in a turbine generator air gap established between its generally annular stator having stator bore and a rotating rotor oriented within the stator bore, where the stator further has a plurality of stator axial slots that are circumferentially aligned about the stator bore. The method comprises providing a plurality of baffle trains for installation within corresponding stator axial slots. Each respective baffle train has a plurality of linearly aligned baffle blocks, each respectively having an external circumferential profile adapted for sliding receipt within a turbine generator stator axial slot; a circumferential baffle sector portion on an upper surface for radial projection into a stator bore when within a stator axial slot; a lower surface; and a thru bore. At least one axial spacer rod, adapted for sliding receipt within a stator axial slot, passes through the respective baffle block thru bores. At least one locking engagement member couples each respective baffle block to the at least one axial spacer rod at an axial location corresponding to a desired axial location of the circumferential baffle sector within the generator bore. The provided baffle train has a selectively reciprocating wedge block rod adapted for orientation within a turbine generator stator axial slot under the baffle blocks lower surfaces. A plurality of linearly aligned wedge blocks are axially spaced relative to each other and coupled to the wedge block rod in axial positions corresponding to each baffle block axial position. Each wedge block respectively has an external circumferential profile adapted for sliding receipt within the turbine generator stator axial slot under the baffle blocks lower surfaces. A plurality of biasing elements are adapted for sliding receipt within a stator axial slot, respectively adapted for biasing the upper surface of a corresponding baffle block into the stator bore when a corresponding wedge block is axially aligned with baffle block lower surface. The method is practiced by aligning the baffle blocks in each baffle train in individual desired axial positions relative to each other by sliding them to a desired axial position on its corresponding axial spacer rod and locking that position with the corresponding locking engagement member, so that corresponding baffle sector portions of the baffle blocks will be in circumferential alignment within the air gap to form a composite air baffle that circumscribes the rotor at a desired axial location within stator bore. The now aligned baffle block baffle trains, including the respective biasing elements, are slid into their corresponding stator axial slots. Next the wedge block rod and wedge block assemblies are slid into their corresponding stator axial slots below the baffle blocks lower surfaces. The respective wedge blocks in each stator axial slot with its corresponding baffle block lower surface are aligned by selectively reciprocating the wedge block rod, thereby biasing the upper surface of a corresponding baffle block toward the stator bore and locking axial orientation of the baffle sector within the stator bore.

The respective features of the invention may be applied jointly or severally in any combination or sub-combination by those skilled in the art.

BRIEF DESCRIPTION OF DRAWINGS

Embodiments of the invention can be readily understood by considering the following detailed description in conjunction with the accompanying drawings, in which:

FIG. 5 is an elevational cross sectional view of an exemplary embodiment of a baffle train of the invention;

FIG. 6 is a bottom plan view of a wedge block rod and wedge block of the embodiment of FIG. 5;

To facilitate understanding, identical reference numerals have been used, where possible, to designate identical elements that are common to the figures.

DESCRIPTION OF EMBODIMENTS

After considering the following description, those skilled in the art will clearly realize that the teachings of the described exemplary embodiments of the invention can be readily utilized in turbine generator baffle trains that do not require extensive hand fitting of individual baffle sector alignment components during initial installation and that maintain the baffle sector components within specified axial and circumferential alignment during turbine operation, so that the composite air baffles establish desired boundary cooling zones within the generator stator/rotor air gap. Air baffle sectors that form the composite air baffle are coupled to baffle blocks of the baffle train. The baffle blocks are independently positioned axially along an axial spacer rod corresponding to the desired position of the composite air baffle within the stator bore. The baffle blocks are locked into position by a locking engagement member. Advantageously, the locked axial position of any particular baffle block is not altered by the locked position of any other baffle block, even if any one or more of the blocks in a given baffle train is subject to dimensional changes during subsequent generator operation. Exemplary embodiments of the invention baffle train also maintain radial alignment and projection of the air baffle sectors into the stator bore, so that radial alignment of the rotor surface and baffle sector are maintained during generator operation, by tensioning the baffle block radially inwardly toward the stator bore. The self-tensioning is accomplished by use of wedge blocks that are axially spaced on a reciprocating wedge block rod within the stator slot below the baffle blocks and a biasing element. The biasing element, such as arched leaf spring, a resilient block of material or a coil spring, is interposed between the baffle block and the bottom surface of the baffle block. Biasing force is applied by the biasing elements to the baffle blocks when the wedge blocks are reciprocated in general axial alignment with the baffle blocks. Conversely, biasing force is not applied at all or substantially weakened when the wedge blocks are reciprocated in positions that are not in general axial alignment with the baffle blocks.

Figure 1:
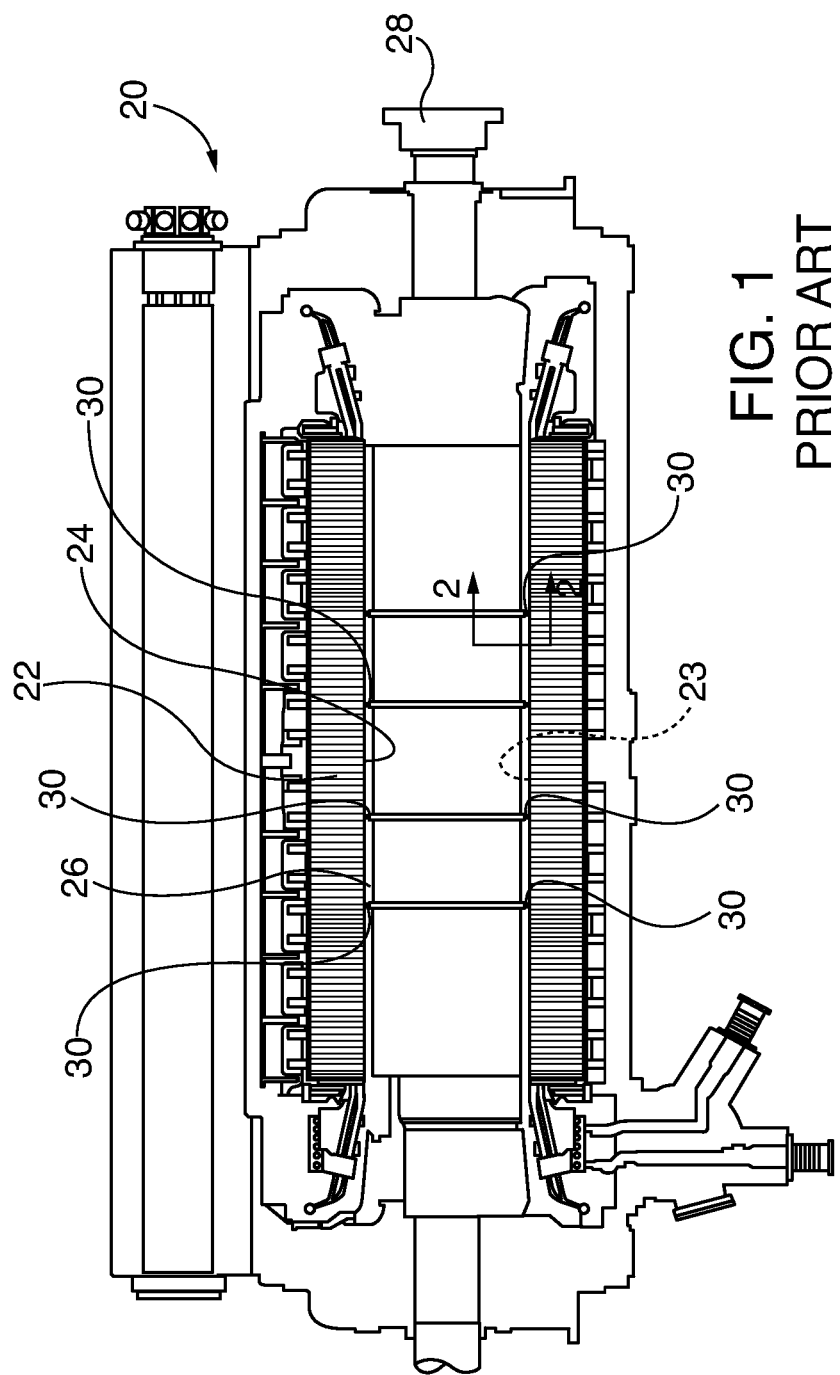
FIG. 1 is an axial cross section of a known turbine generator with axially aligned air baffles positioned by known baffle trains.
Figure 2:
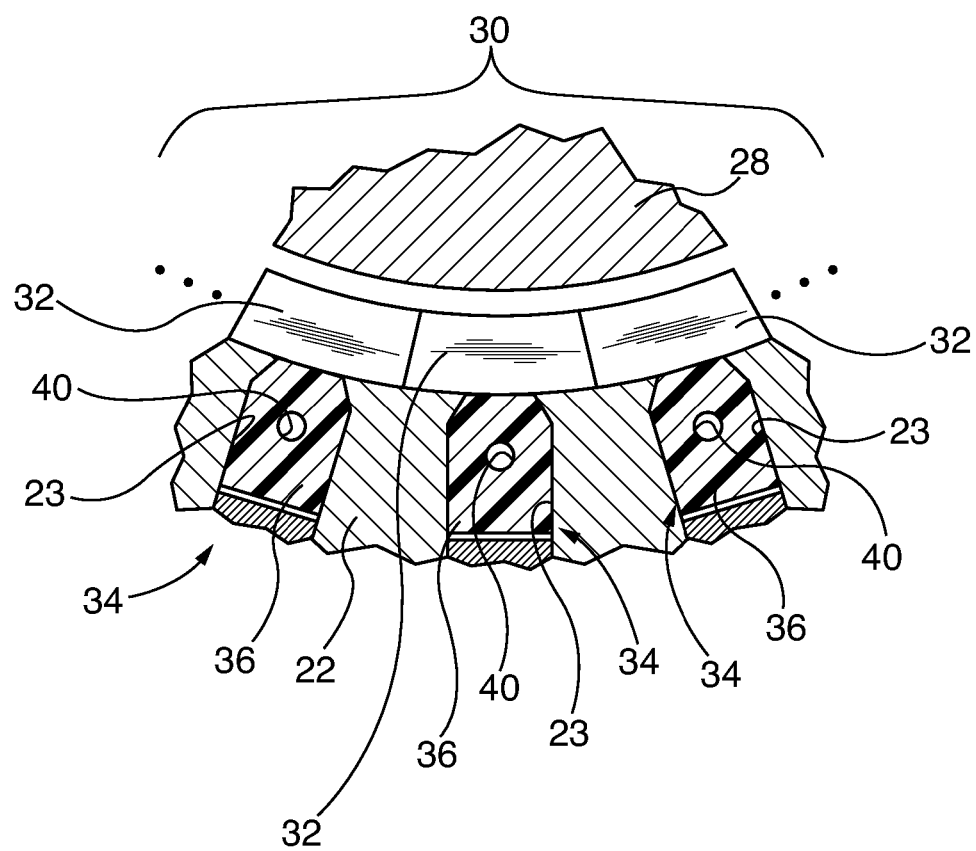
FIG. 2 is a partial radial cross section of the generator of FIG. 1 showing three axially and circumferentially aligned baffle sectors and their corresponding known baffle trains forming a composite air baffle.
Figure 3:
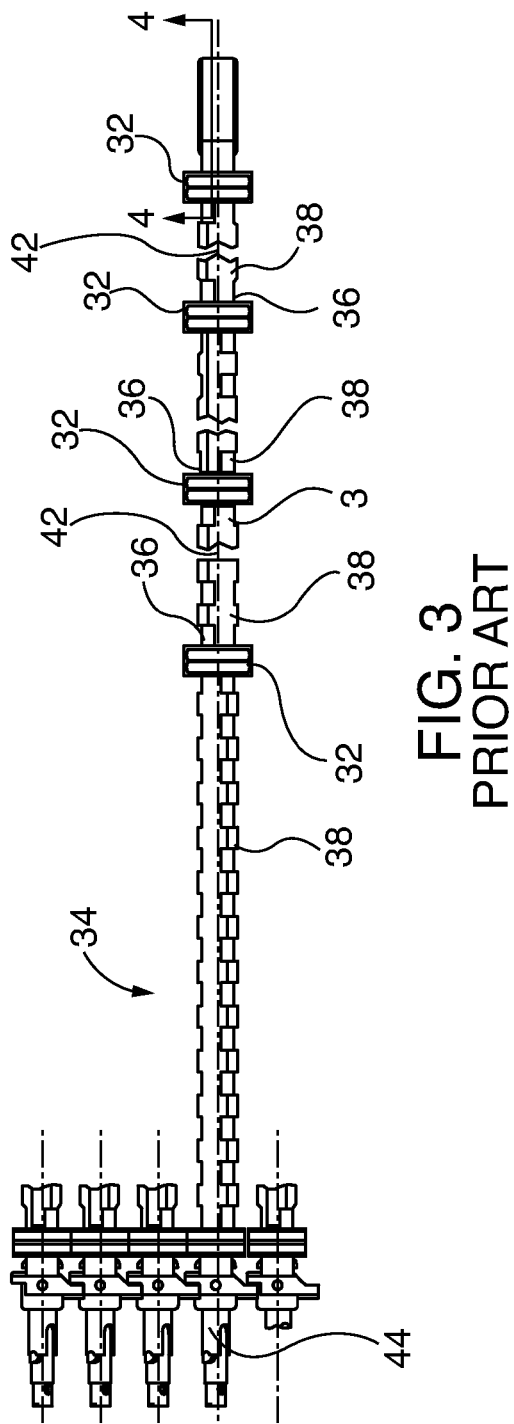
FIG. 3 is a plan view of a known baffle train.
Figure 4:
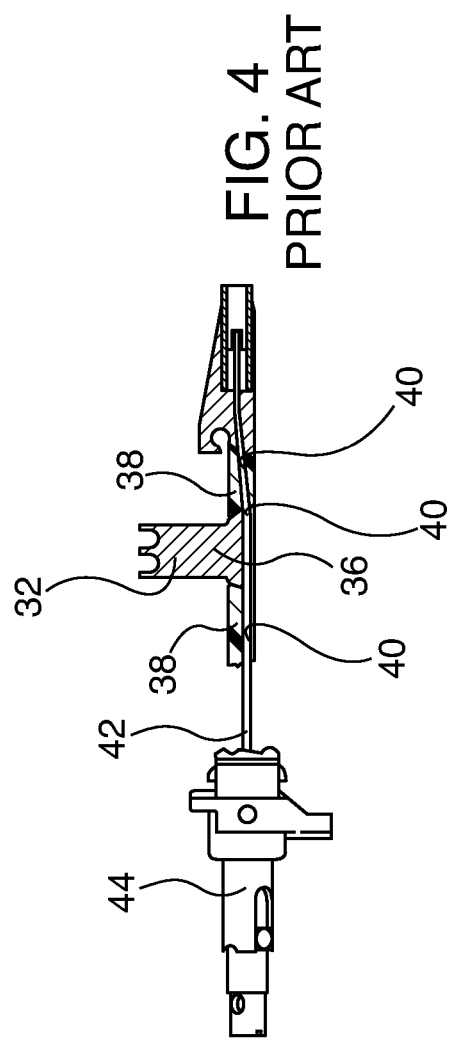
FIG. 4 is an elevational cross sectional view of the known baffle train of FIG. 3.

Exemplary embodiments of the air gap baffle train 48 of the invention are shown in FIGS. 5-10. The baffle train 48 is substituted for the known baffle train 34 of FIGS. 1-4. Therefore, the FIG. 1 prior art drawing of the turbine generator 20, including its stator 22, stator slots 23 within the stator bore 24 and the air gap 26 defined the stator and the rotor 28 remains relevant for understanding interrelationship of radial and axial alignment of the composite air baffles 30. As stated above, the composite air baffles 30 orientations within the air gap 26 are supported and established by the circumferentially arrayed baffle trains 48 of this invention.

Figure 7:
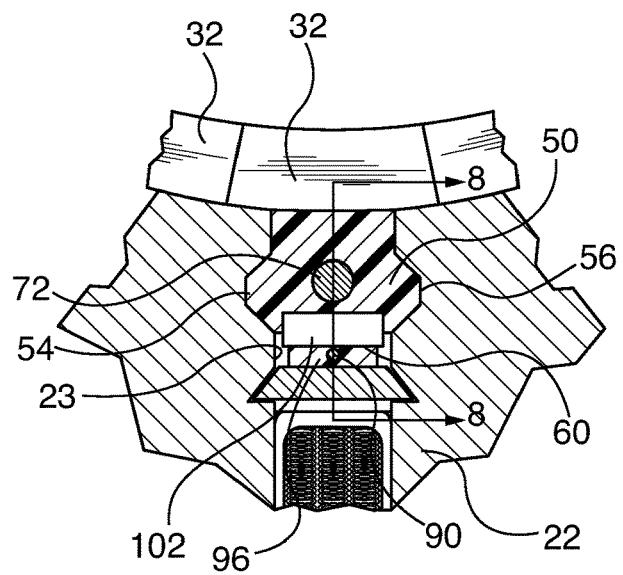
FIG. 7 is an elevational cross sectional view of the baffle train embodiment of FIG. 5.
Figure 8:
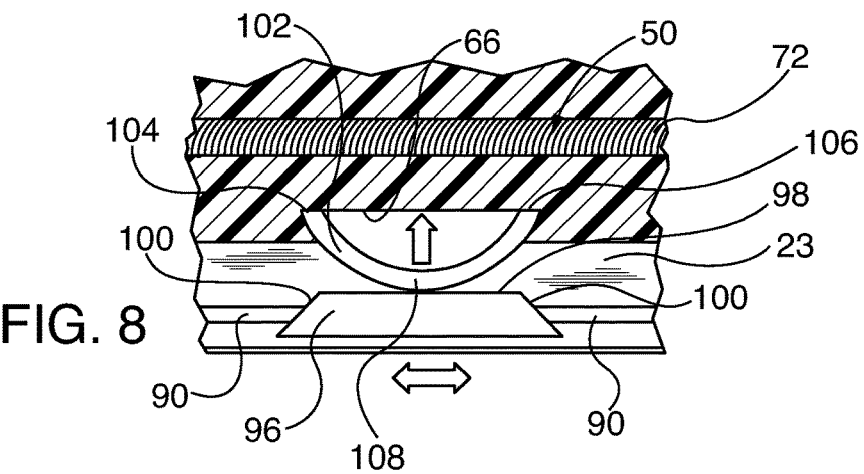
FIG. 8 is an elevational cross sectional view of a an exemplary embodiment of a baffle block and arch leaf spring biasing element of the baffle train of FIG. 5.

FIG. 5 is an elevational view of the baffle train apparatus 48, having a plurality of linearly aligned baffle blocks 50. In order to simplify FIG. 5, only two baffle blocks 50 are shown. As shown in FIG. 7, the baffle block 50 has an upper surface 52 that is coupled to a circumferential baffle sector portion 32. As previously described, the baffle sector portion 32 projects radially inwardly into the stator bore 24. The baffle block baffle sector portions 32 of circumferentially adjoining baffle trains in combination form a composite air baffle 30 about the circumference of the stator bore 24. The baffle block 50 external circumferential profile is adapted for sliding receipt within the female dovetail profile of the stator axial slot 23. That external circumferential profile is defined by the upper surface 52, the circumferential sides 54, 56 and a lower surface 60. The baffle block 50 has an axially aligned thru bore 61. A dovetail 66 is optionally incorporated within the baffle block lower surface 60. Exemplary baffle blocks 50 are constructed of cotton phenolic material.

The baffle train 48 also has at least one axial spacer rod, such as those in the spacer rod assembly 70 of FIG. 5. The individual spacer rods within the spacer rod assembly 70 are adapted for sliding receipt within a turbine generator stator axial slot 23, passing through the respective baffle block 50 thru bores 61. In some embodiments, the spacer rods outer diameter and baffle block 50 mating thru bore 61 diameter are sized for bind-free sliding of the baffle block along the spacer rod. Alternatively, the mating bore 61 and the entire length of the axial spacer rod of the spacer rod assembly 70 have mating thread profiles so that the wedge blocks 50 are axially aligned by advancing along the mating threaded surfaces. The spacer rod assembly 78 facilitates independent axial alignment each of the baffle blocks 50 along its length without the need to trim length or circumferential dimensions of the blocks. In this way a common dimensioned baffle block 50 can be used anywhere along the spacer rod assembly.

In some generator 20 applications the spacer rod assembly 70 comprises multiple axial spacer rods that are joined together by another mating component in the baffle train 50, such as a coupler. As shown in the exemplary embodiment of FIG. 5, first 72 and second 78 axial spacer rods respectively has threaded ends for engagement with other components in the baffle train 50 that are intermediate corresponding baffle blocks 50. More particularly, in FIG. 5 the first axial spacer rod 72 has a first threaded end 74 and a second threaded end 76. Similar construction spacer rod 78 has a first threaded end 80 and a second threaded end 82. First spacer rod second threaded end 76 and second spacer rod 78 first threaded end 80 are joined by an internally threaded coupler 84. By splitting the entire assembled length of a spacer rod 70 assembly into separately assembled shorter spacer rods, e.g., the axial spacer rods 72 and 78, precision alignment of various zones in one air gap cooling section can be accomplished on an assembly bench. Then the spacer rod portions are assembled into the completed baffle train 48, with adjoining axial spacer rod sections precisely aligned and dimensioned axially to desired specifications by withdrawing or advancing the adjoining threaded ends 76, 80 in the threaded coupler 84. As shown in FIG. 5, partial circumferential portions of or the entire length of the axial spacer rods 72, 78 of the axial spacer rod assembly 70 are threaded as a matter of design choice. Entire-length threaded axial spacer rods allow purchase of standard length threaded composite plastic or metal rod stock that can be trimmed to length without the need for subsequent threading or the need to inventory different length rods having only threaded ends. As previously noted the spacer block 50 internal bore 61 may also be threaded to mate with the spacer rod external threads of a full-length threaded spacer rod assembly 70.

At least one locking engagement member couples each respective baffle block 50 to its corresponding spacer rod 70 assembly at an axial location corresponding to a desired axial location of the circumferential baffle sector 32 within the generator bore 24. In the FIG. 5 embodiment the locking engagement member comprises first and second locating nuts 62, 64 flanking the baffle block 50 that are in threaded engagement with mating threads formed on the spacer rod 70 assembly first and second spacer rods 72, 78. The locating nuts are constructed of material that is thermally and mechanically compatible with the wedge block 50 material, such as composite thermosetting or thermoplastic materials.

While specific exemplary orientations of male and female threaded spacer rods 72, 78, locking nuts 62, 64 and couplers 84 engagement members are shown in FIGS. 5-10, other spacer rod joining and/or baffle block 50 locking engagement member structures may be substituted for those exemplary structures. For example, thread surfaces can be reversed by employing male threaded couplers and female threaded axial spacer rod ends. Depending on the selected component materials for the spacer rod assembly 70 and the engagement members, other interlocking structures, such as clamps, interlocking engagement surfaces within the rod ends, screws, pins, splined keys, circumferential clips such as "E clips", staked fasteners, wrapped retaining wire, weld joints, brazed joints, soldered joints or adhesively locked joints are suitable substitutes for the threaded fastening engagement members shown in those figures.

The baffle train 48 also has a selectively reciprocating wedge block rod 90 that is adapted for orientation within a turbine generator stator axial slot 23 under the baffle blocks 50 lower surfaces 60. The wedge block rod 90 has a plurality of wedge block rod collars 92 coupled thereto that are axially spaced relative to each other in axial positions approximately corresponding to each baffle block 50 axial position. In exemplary embodiments nonmagnetic metal collars 92 are coupled to the a nonmagnetic metal wedge block rod 90 by weld, braze or solder joints, pins, disruptive metal deformation staking, fasteners, pins, keys or other known mechanical fastening components or methods. A plurality of linearly aligned wedge blocks 96 define recesses that are engaged over and coupled to corresponding collars 92, such as by filling the recesses with hardening resin or adhesive compounds. When the wedge blocks 96 are coupled to the wedge block rod 90 they are axially aligned with corresponding baffle block lower surfaces 60. Each wedge block 96 respectively has an external circumferential profile adapted for sliding receipt within the turbine generator stator axial slot under the baffle blocks lower surfaces 60 and have wedge block upper surfaces 98 that are in opposed relationship with the baffle block lower surfaces. The wedge blocks have beveled front and rear surfaces 100 that provide ramping surfaces when reciprocating the wedge block rod 90 within the generator stator axial slot 23.

In the baffle train 48 a plurality of biasing elements are adapted for sliding receipt within the turbine generator stator axial slot 23 along with the baffle block 50/spacer rod assembly 70 and the wedge block rod 90/wedge blocks 96. The respective biasing elements are adapted for biasing the upper surface 52 of a corresponding baffle block 50 toward the stator bore 24 when a corresponding wedge block 96 upper surface 98 is axially aligned with a baffle block lower surface 60. When a baffle block 50 is so biased against the upper dovetail portion of its corresponding axial stator slot 23 the baffle block's corresponding coupled air baffle sector 32 is maintained in specification axial and radial alignment within the stator-rotor air gap 26 during the generator 20 entire operational cycle, notwithstanding any potential dimensional changes in the baffle block or vibration induced forces on the wedge block 50 during that operational cycle.

In FIGS. 5-8 the biasing element is an arch spring 102 type of leaf spring, having arch spring distal ends 104, 106 that are retained in the baffle block lower surface 60 dovetail 66. The arch spring 102 has a central convex portion 108 that abuts against a corresponding wedge block upper surface 98 when the wedge block 96 is axially aligned with the baffle block 50 lower surface 60. The now compressed arch spring 102 biases the baffle block 50 against the upper dovetailed portion of the corresponding stator axial slot 23. Conversely, when the wedge blocks 96 are reciprocated out of axial alignment with the baffle block 50 lower surface the biasing force is reduced or relaxed in its entirety. An exemplary arch spring 102 is constructed of composite material.

Figure 9:
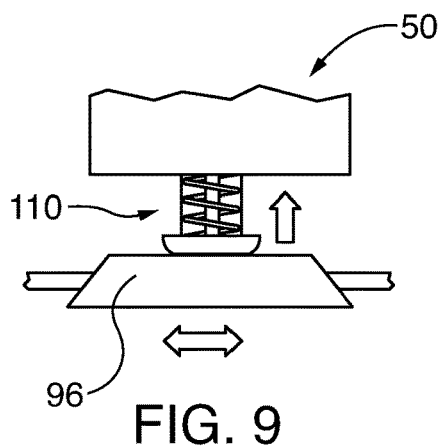
FIG. 9 is an alternative embodiment of a baffle block and captured coil spring biasing element of a baffle train of the invention.
Figure 10:
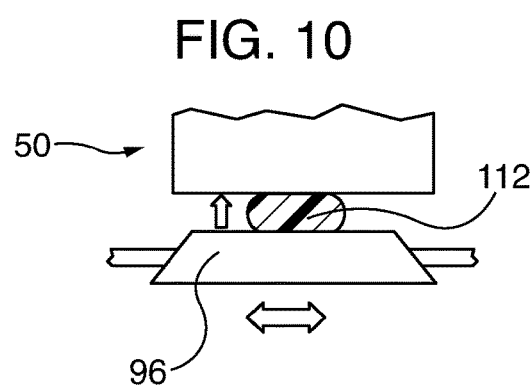
FIG. 10 is another alternative embodiment of a baffle block and deformable resilient block biasing element of a baffle train of the invention.

Other types of biasing elements, including other types of spring mechanisms, may be substituted for the arch spring 102. In FIG. 9 the shown exemplary biasing element is a coil spring 110 and more specifically a captured coil spring. Optionally, a ball-type detent mechanism can be coupled to the distal end of the coil spring 110 so that it mates with a recess in the wedge block 96 upper surface 98 In FIG. 10 the biasing element is a block of resilient material 112, such as polyurethane or synthetic rubber that is compressed when in abutting contact with a corresponding wedge block that is axially aligned with the baffle block lower surface. Generally the components within the baffle train 48 are preferably constructed of nonmagnetic materials, such as cotton phenolic composites, glass epoxy composites and stainless steel.

The baffle trains 48 of the invention are substituted for known baffle trains 34 and are installed in known turbine generator 20 stator axial slots 23 after the rotor 28 has been aligned within the stator bore 24. After installation the respective axially aligned air baffle sectors 32 in the respective baffle trains 48 about the stator bore 24 circumference collectively form the composite cooling air baffles 30 at specified axial locations along the stator bore 24 within the air gap 26.

Baffle trains 48 are installed by aligning the baffle blocks 50 in each baffle train in individual desired axial positions relative to each other by sliding advancing on mating threads to a desired axial position on its corresponding axial spacer rod assembly 70. The baffle block 50 is locked with the corresponding locking engagement member, such as by tightening the locating nuts 62, 64 in compressive contact with the baffle block, so that corresponding baffle sector portions 32 of the baffle blocks will be in circumferential alignment within the air gap 26 to form the composite air baffle 30 that circumscribes the rotor 28 at a desired axial location within stator bore 23. The now aligned baffle blocks 50 that are locked into position on the axial alignment rod assembly 70, including the respective biasing elements, such as the arch springs 102, are slid axially into their corresponding stator axial slots 23 and are retained in fixed position by known tensioning devices within the generator 20. Next the assembled the wedge block rod 90 and wedge block 96 assemblies are slid axially into their corresponding stator axial slots 23 below the corresponding baffle block lower surfaces 60. The beveled surfaces 100 of the wedge blocks 96 facilitate sliding insertion under the biasing element arch springs 102. The respective wedge block upper surfaces 98 in each stator axial slot 23 are now aligned with its corresponding baffle block lower surface 60 by selectively reciprocating the wedge block rod 90, thereby biasing the upper surface 52 of a corresponding baffle block 50 toward the stator bore 24. So long as the convex portion 108 of the arch spring 102 abuts some portion of the wedge block upper surface 98 biasing force will be established. Thus precise axial alignment of the baffle blocks 50 and their corresponding wedge blocks 96 are not needed to establish the requisite biasing force. After desired reciprocation alignment of the baffle blocks 50 and their corresponding wedge blocks 96 the wedge block rod 92 is retained in the final fixed position within the generator 20. Once a baffle block 50 is biased toward the stator bore 24, radial alignment of the corresponding baffle sector 32 will remain unchanged during generator 20 operation. Correspondingly, axial orientation of each baffle sector 32 is also independently fixed within the stator bore the axial alignment rod assembly 70 during generator operation.

Although various embodiments that incorporate the teachings of the present invention have been shown and described in detail herein, those skilled in the art can readily devise many other varied embodiments that still incorporate these teachings. The invention is not limited in its application to the exemplary embodiment details of construction and the arrangement of components set forth in the description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass direct and indirect mountings, connections, supports, and couplings. Further, "connected" and "coupled" are not restricted to physical or mechanical connections or couplings.

What is claimed is:

1. A turbine generator baffle train apparatus, comprising:
   a plurality of linearly aligned baffle blocks, each respectively having an external circumferential profile adapted for sliding receipt within an axial slot of a turbine generator stator bore, a circumferential baffle sector portion on an upper surface for radially inwardly projection into a turbine generator bore when within a stator axial slot, a lower surface, and a thru bore;
   at least one axial spacer rod, adapted for sliding receipt within a turbine generator stator axial slot, passing through the respective baffle block thru bores;
   at least one locking engagement member coupling each respective baffle block to the at least one axial spacer rod at an axial location corresponding to a desired axial location of the circumferential baffle sector within a generator bore;
   a selectively reciprocating wedge block rod adapted for orientation within a turbine generator stator axial slot under the baffle blocks lower surfaces;
   a plurality of linearly aligned wedge blocks that are axially spaced relative to each other and coupled to the wedge block rod in axial positions corresponding to each baffle block axial position, each wedge block respectively having an external circumferential profile adapted for sliding receipt within a turbine generator stator axial slot under the baffle blocks lower surfaces; and
   a plurality of biasing elements adapted for sliding receipt within a turbine generator stator axial slot, respectively adapted for biasing the upper surface of a corresponding baffle block toward a stator bore when a corresponding wedge block is axially aligned with a baffle block lower surface.

2. The apparatus of claim 1, the at least one axial spacer rod further comprising a first threaded portion engaging a mating second threaded portion in the baffle train intermediate corresponding baffle blocks, for adjusting rod length by advancing or withdrawing the mating first and second threaded portions relative to each other.

3. The apparatus of claim 2, further comprising the first threaded portion oriented on a first axial end of the at least one axial spacer rod and a coupler having the mating second threaded portion.

4. The apparatus of claim 1, the locking engagement member of at least one of the baffle blocks further comprising first and second locating nuts flanking the baffle block that are in threaded engagement with a third threaded portion formed on the at least one axial spacer rod.

5. The apparatus of claim 1, at least one of the biasing elements further comprising a leaf spring.

6. The apparatus of claim 5, the at least one leaf spring further comprising an arched leaf spring having leaf spring ends thereof coupled to the lower surface of a baffle block.

7. The apparatus of claim 6, further comprising the at least one arched leaf spring having a convex portion intermediate its leaf spring ends that is in abutting contact with a corresponding wedge block that is axially aligned with the baffle block lower surface.

8. The apparatus of claim 1, at least one of the biasing elements further comprising a block of resilient material that is compressed when in abutting contact with a corresponding wedge block that is axially aligned with the baffle block lower surface.

9. The apparatus of claim 1, at least one of the biasing elements further comprising a coil spring that is compressed when in abutting contact with a corresponding wedge block that is axially aligned with the baffle block lower surface.

10. A turbine generator, comprising:
    a generally annular stator having stator bore and a plurality of stator axial slots circumferentially aligned about the stator bore;
    a rotating rotor oriented within the stator bore;
    an annular air gap defined between the rotor and stator bore;
    a plurality of baffle trains, respectively oriented within a corresponding stator axial slot, establishing in combination an axially aligned composite airflow baffle circumscribing the stator bore and thereby establishing cooling airflow zones in the air gap bounded by the composite baffle, each respective baffle train having:
       a plurality of linearly aligned baffle blocks, each respectively having an external circumferential profile adapted for sliding receipt within the stator axial slot, a circumferential baffle sector portion on an upper surface projecting radially into the stator bore to form the composite airflow baffle with corresponding baffle sector portions of other baffle trains, a lower surface, and a thru bore;
       a plurality of axial spacer rods, for selectively varying the baffle block axial position within the corresponding stator slot, adapted for sliding receipt within the stator axial slot, passing through the respective baffle block thru bores;
       at least one locking engagement member coupling each respective baffle block to the axial spacer rod at an axial location corresponding to a desired axial location of the circumferential baffle sector within the generator bore;
       a selectively reciprocating wedge block rod adapted for orientation within the corresponding stator axial slot under the baffle blocks lower surfaces;
       a plurality of linearly aligned wedge blocks that are axially spaced relative to each other and coupled to the wedge block rod in axial positions corresponding to each baffle block axial position, each wedge block respectively having an external circumferential profile adapted for sliding receipt within the corresponding stator axial slot under the baffle blocks lower surfaces; and
       a plurality of biasing elements adapted for sliding receipt within the corresponding stator axial slot, respectively adapted for biasing the upper surface of a corresponding baffle block toward the stator bore when a corresponding wedge block is axially aligned with the baffle block lower surface.

11. The apparatus of claim 10, at least one axial spacer rod further comprising a first threaded portion engaging a mating second threaded portion in the baffle train intermediate corresponding baffle blocks, for adjusting rod length by advancing or withdrawing the mating first and second threaded portions relative to each other.

12. The apparatus of claim 11, further comprising the first threaded portion oriented on a first axial end of the at least one axial spacer rod and a coupler having the mating second threaded portion.

13. The apparatus of claim 10, the locking engagement member of at least one of the baffle blocks further comprising first and second locating nuts flanking the baffle block that are in threaded engagement with a third threaded portion formed on the at least one axial spacer rod.

14. The apparatus of claim 10, at least one of the biasing elements further comprising a leaf spring.

15. The apparatus of claim 14, the at least one leaf spring further comprising an arched leaf spring having leaf spring ends thereof coupled to the lower surface of a baffle block.

16. The apparatus of claim 15, further comprising the at least one arched leaf spring having a convex portion intermediate its leaf spring ends that is in abutting contact with a corresponding wedge block that is axially aligned with the baffle block lower surface.

17. The apparatus of claim 10, at least one of the biasing elements further comprising a block of resilient material that is compressed when in abutting contact with a corresponding wedge block that is axially aligned with the baffle block lower surface.

18. A method for axially aligning circumferential cooling air baffles in a turbine generator air gap established between its generally annular stator having stator bore and a rotating rotor oriented within the stator bore, the stator further having a plurality of stator axial slots circumferentially aligned about the stator bore, comprising:
  providing a plurality of baffle trains for installation within corresponding stator axial slots each respective baffle train having:
    a plurality of linearly aligned baffle blocks, each respectively having an external circumferential profile adapted for sliding receipt within the stator axial slot, a circumferential baffle sector portion on an upper surface for radial projection into the stator bore when within a stator axial slot, a lower surface, and a thru bore;
    at least one axial spacer rod, adapted for sliding receipt within the stator axial slot, passing through the respective baffle block thru bores;
    at least one locking engagement member coupling each respective baffle block to the at least one axial spacer rod at an axial location corresponding to a desired axial location of the circumferential baffle sector within the generator bore;
    a selectively reciprocating wedge block rod adapted for orientation within a turbine generator stator axial slot under the baffle blocks lower surfaces;
    a plurality of linearly aligned wedge blocks that are axially spaced relative to each other and coupled to the wedge block rod in axial positions corresponding to each baffle block axial position, each wedge block respectively having an external circumferential profile adapted for sliding receipt within the turbine generator stator axial slot under the baffle blocks lower surfaces; and
    a plurality of biasing elements adapted for sliding receipt within a turbine generator stator axial slot, respectively adapted for biasing the upper surface of a corresponding baffle toward the stator bore when a corresponding wedge block is axially aligned with baffle block lower surface;
  aligning the baffle blocks in each baffle train in individual desired axial positions relative to each other by sliding them to a desired axial position on its corresponding axial spacer rod and locking that position with the corresponding locking engagement member, so that corresponding baffle sector portions of the baffle blocks will be in circumferential alignment within the air gap to form the composite air baffle that circumscribes the rotor at a desired axial location within stator bore;
  sliding the now aligned baffle block baffle trains, including the respective biasing elements, into their corresponding stator axial slots;
  sliding the wedge block rod and wedge block assemblies into their corresponding stator axial slots below the baffle block lower surfaces;
  aligning the respective wedge blocks in each stator axial slot with its corresponding baffle block lower surface by selectively reciprocating the wedge block rod, thereby biasing the upper surface of a corresponding baffle block toward the stator bore and locking axial orientation of the baffle sector within the stator bore.

19. The method of claim 18, further comprising providing at least one locking engagement member of at least one of the baffle blocks, which further comprises first and second locating nuts flanking the baffle block that are in threaded engagement with a third threaded portion formed on the at least one axial spacer rod.

20. The method of claim 18, further comprising providing at least one arched leaf spring biasing element having a convex portion intermediate its leaf spring ends that is in abutting contact with a corresponding wedge block that is axially aligned with the baffle block.

* * * * *